(12) United States Patent
Jiang et al.

(10) Patent No.: US 7,689,218 B2
(45) Date of Patent: Mar. 30, 2010

(54) METHOD, APPARATUS AND COMPUTER PROGRAM PROVIDING NETWORK-ASSOCIATED SYSTEM PRIORITY LIST FOR MULTIMODE SYSTEM SELECTION

(75) Inventors: Jack Yuefeng Jiang, Poway, CA (US); Paul Oommen, San Diego, CA (US); Yi Cheng, San Diego, CA (US); Liangchi Hsu, San Diego, CA (US)

(73) Assignee: Nokia Corporation, Espoo (FI)

( * ) Notice: Subject to any disclaimer, the term of this patent is extended or adjusted under 35 U.S.C. 154(b) by 667 days.

(21) Appl. No.: 11/403,443

(22) Filed: Apr. 13, 2006

(65) Prior Publication Data

US 2006/0282554 A1 Dec. 14, 2006

Related U.S. Application Data

(63) Continuation-in-part of application No. 11/107,495, filed on Apr. 14, 2005.

(60) Provisional application No. 60/671,288, filed on Apr. 14, 2005, provisional application No. 60/711,513, filed on Aug. 26, 2005.

(51) Int. Cl.
*H04W 4/00* (2006.01)
(52) U.S. Cl. .................. 455/435.2; 455/435.3; 455/558
(58) Field of Classification Search ... 455/435.2–435.3, 455/432.1, 558
See application file for complete search history.

(56) References Cited

U.S. PATENT DOCUMENTS

| | | | | |
|---|---|---|---|---|
| 5,305,372 | A | 4/1994 | Tomiyori | 379/59 |
| 5,442,806 | A | 8/1995 | Barber et al. | 455/33.1 |
| 5,754,542 | A | 5/1998 | Ault et al. | 370/342 |
| 5,903,382 | A | 5/1999 | Tench et al. | 359/265 |
| 5,903,832 | A | 5/1999 | Seppanen et al. | 455/414 |
| 5,915,214 | A | 6/1999 | Reece et al. | 455/406 |
| 5,983,092 | A | 11/1999 | Whinnett et al. | 455/406 |
| 6,085,085 | A * | 7/2000 | Blakeney et al. | 455/426.1 |
| 6,119,003 | A * | 9/2000 | Kukkohovi | 455/435.2 |
| 6,208,857 | B1 | 3/2001 | Agre et al. | 455/428 |
| 6,438,369 | B1 | 8/2002 | Huang et al. | 455/417 |
| 6,529,491 | B1 * | 3/2003 | Chang et al. | 370/335 |

(Continued)

FOREIGN PATENT DOCUMENTS

EP 0 781 064 A2 6/1997

(Continued)

OTHER PUBLICATIONS

Rohini, P.P., "Over-The-Air Provisioning in CDMA", Oct. 2004, pp. 1-7.

(Continued)

*Primary Examiner*—Kamran Afshar
(74) *Attorney, Agent, or Firm*—Harrington & Smith

(57) ABSTRACT

A method includes provisioning a multi-mode wireless communications terminal with at least one system priority list (SPL) having information that identifies a plurality of wireless network system types and, for each identified wireless network system type, at least one wireless network of that type. The method selects from the SPL a wireless network for service selectively based on one of a manually specified priority, a priority specified automatically and a priority that is specified for use automatically only during a power-on mode of operation.

27 Claims, 8 Drawing Sheets

U.S. PATENT DOCUMENTS

| | | | |
|---|---|---|---|
| 6,625,451 B1 * | 9/2003 | La Medica et al. | 455/434 |
| 6,684,082 B1 | 1/2004 | McClure | 455/552.1 |
| 6,728,536 B1 | 4/2004 | Basilier et al. | 455/432 |
| 6,748,217 B1 | 6/2004 | Hunzinger et al. | 455/435.2 |
| 6,751,460 B2 | 6/2004 | Korpela et al. | 455/449 |
| 6,766,169 B2 | 7/2004 | Cooper | 455/435.2 |
| 6,782,278 B2 | 8/2004 | Chen et al. | 455/564 |
| 6,873,836 B1 | 3/2005 | Sorrells et al. | 455/313 |
| 6,934,544 B2 | 8/2005 | Cooper et al. | 455/435.2 |
| 6,968,214 B2 | 11/2005 | Bumiller | 455/564 |
| 6,978,142 B2 | 12/2005 | Jokimies | 455/449 |
| 7,043,239 B2 * | 5/2006 | Uchida | 455/432.1 |
| 7,069,026 B2 | 6/2006 | McClure | 455/456.3 |
| 7,072,651 B2 | 7/2006 | Jiang et al. | 455/432.1 |
| 7,120,436 B2 | 10/2006 | Kim | 455/433 |
| 7,167,707 B1 | 1/2007 | Gazzard et al. | 455/434 |
| 7,519,365 B2 | 4/2009 | Dorsey et al. | 455/435.1 |
| 2002/0087674 A1 | 7/2002 | Guilford et al. | 709/223 |
| 2003/0017842 A1 | 1/2003 | Moles et al. | 455/552 |
| 2003/0022697 A1 | 1/2003 | Chen et al. | 455/564 |
| 2003/0134637 A1 | 7/2003 | Cooper | 455/432 |
| 2003/0148774 A1 | 8/2003 | Naghian et al. | 455/456 |
| 2004/0148352 A1 | 7/2004 | Menon et al. | 709/205 |
| 2004/0224684 A1 | 11/2004 | Dorsey et al. | 455/434 |
| 2004/0235475 A1 | 11/2004 | Ishii | 455/435.3 |
| 2004/0249915 A1 * | 12/2004 | Russell | 709/223 |
| 2005/0037755 A1 * | 2/2005 | Hind et al. | 455/435.3 |
| 2005/0083899 A1 | 4/2005 | Babbar et al. | 370/342 |
| 2005/0227692 A1 | 10/2005 | Kawashima et al. | 455/435.2 |
| 2006/0234705 A1 * | 10/2006 | Oommen | 455/435.3 |
| 2006/0282554 A1 | 12/2006 | Jiang et al. | 710/14 |
| 2007/0019575 A1 | 1/2007 | Shaheen | 370/310 |

FOREIGN PATENT DOCUMENTS

| | | |
|---|---|---|
| EP | 0 980 190 A1 | 2/2000 |
| EP | 1 246 499 A1 | 10/2002 |
| EP | 1 519 615 A2 | 3/2005 |
| WO | WO 03/067918 A1 | 8/2003 |
| WO | WO 2005/117463 A2 | 12/2005 |
| WO | WO-2005/117468 A1 | 12/2005 |
| WO | WO 2005/122601 A2 | 12/2005 |

OTHER PUBLICATIONS

EGPP2 C.S0064-0, IP Based Over-the-Air Device Management (IOTA-DM) for cdma2000 Systems, Release 0, Version 1.0, Sep. 6, 2005, 64 pages.

3GPP TS 25.304, V7.1.0, $3^{rd}$ Generation Partnership Project; "Technical Specification Group Radio Access Network; User Equipment (UE) procedures in idle mode and procedures for cell reselection in connected mode", (Release 7) (Dec. 2006).

3GPP TS 45.008, V7.6.0, $3^{rd}$ Generation Partnership Project; "Technical Specification Group GSM/EDGE Radio Access Network; Radio subsystem link control", (Release 7) (Nov. 2006).

3GPP TSG-CN Meeting #23, Phoenix USA, Mar. 10-12, 2004, "Use of the Radio Access Technology (RAT) during background scanning", XP-002485679, Tdoc NP-040098, Source: O₂, T-Mobile, Orange . . . , Agenda item: 9.22.

3GPP TSG-CN Meeting #23, Phoenix, USA, Mar. 10-12, 2004, "Issues relating to use of radio access technology (RAT) in the periodic PLMN scan", XP-002485680, NP-040116, Source: Motorola, Agenda item: 9.22.

* cited by examiner

| INDEX | SYSTEM TYPE | PRIORITY NETWORKS | SYSTEM PRIORITY |
|---|---|---|---|
| 0 | CDMA2000/IS95 | HOME | MORE |
| 1 | GSM/WCDMA | HOME | SAME |
| 2 | WLAN | ANY | MORE |
| 3 | GSM/WCDMA | PREFERRED | MORE |
| 4 | GSM/WCDMA | ANY | SAME |

FIG.2

"LOCATION" ASSOCIATION

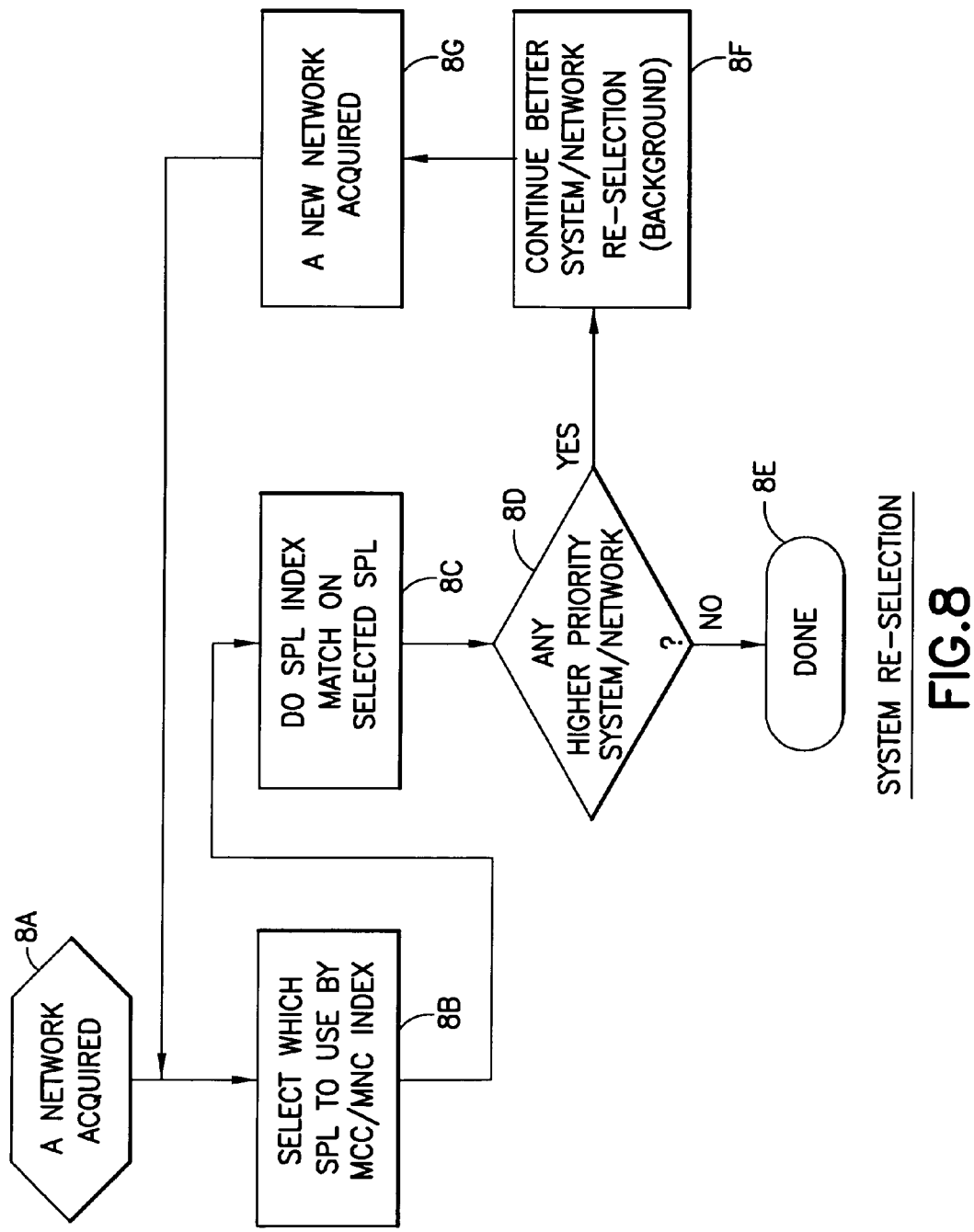

METHOD, APPARATUS AND COMPUTER PROGRAM PROVIDING NETWORK-ASSOCIATED SYSTEM PRIORITY LIST FOR MULTIMODE SYSTEM SELECTION

CLAIM OF PRIORITY

This patent application claims priority under 35 U.S.C 119(e) from U.S. Provisional Patent Application No.: 60/671,288, filed on Apr. 14, 2005, and from U.S. Provisional Patent Application No.: 60/711,513, filed on Aug. 26, 2005. The contents of each of these Provisional Patent Applications are incorporated by reference herein in their entirety. This patent application also is a continuation-in-part of, and claims priority under 35 U.S.C. 120 from, U.S. patent application Ser. No. 11/107,495, filed on Apr. 14, 2005.

TECHNICAL FIELD

The exemplary embodiments of this invention relate generally to wireless communication devices and terminals and, more specifically, relate to multimode-capable terminals.

BACKGROUND

The following abbreviations that appear herein are defined as follows:
3GPP—Third Generation Partnership Project, http://www.3gpp.org/
3GPP2—Third Generation Partnership Project 2, http://www.3gpp2.org/
GSM—Global System for Mobile Communication—radio access technology specified by 3GPP, http://www.3gpp.org/
CDMA—Code Division Multiple Access—radio access technology specified by 3GPP2, http://www.3gpp2.org/
DM—Device Management
IOTA-DM—IP Based Over-the-Air DM
MCC—Mobile Country Code
MNC—Mobile Network Code
MS—Mobile Station
MT—Multimode Terminal
Node B—Base Station (BS)
OMA—Open Mobile Alliance
OTAPA—Over-the-Air Parameter Administration
OTASP—Over-the-Air Service Provisioning
PLMN—Public Land Mobile Network
PRL—Preferred Roaming List
RNC—Radio Network Controller
SIM—Subscriber Identification Module
SSID—service set identifier, a sequence of characters that uniquely names a WLAN
UE—User Equipment
UIM—User Identification Module
WCDMA—Wideband Code Division Multiple Access—radio access technology specified by 3GPP, http://www.3gpp.org/
WLAN—Wireless Local Area Network A multimode terminal may be defined as a terminal capable of accessing services from different networks that operate using different systems, i.e., that operate using different radio access technologies such as, but not limited to, GSM/WCDMA, CDMA2000 and WLAN.

Prior to receiving any services from a network operator, the multimode terminal needs to select a network from a system to access. Network selection in a one-system domain such as GSM/WCDMA and CDMA2000 has been specified in 3GPP and 3GPP2, respectively. However, network selection in a multi-system domain is still under development. In general, however, the multimode terminal should perform system selection according to a set of pre-defined preferences by network operators and/or users. The multimode terminal then should perform network selection according to system specific procedures. Ultimately the multimode terminal should have a capability to select a most desired network (e.g., a HOME network) from a most desired system (e.g., a. business effective system).

In addition, the multimode terminal should have a capability to support different modes of system selection, such as manually by the user, and automatically by the terminal.

It has been recommended in 3GPP2 that multimode system selection should use a framework referred to as an overlay function. A set of requirements for an overlay function has been previously proposed in 3GPP2.

In general, prior to receiving any services from network operator(s), the multimode terminal has to select a system (i.e., an access technology) and a corresponding network to access. Network operators would typically prefer to specify a system priority list for the terminal to follow so that the terminal can select a suitable system and a suitable network per operator preference.

A need currently exists to provide efficient techniques for achieving multimode system selection, as does a need to provide a multimode terminal having an optimized multimode system selection capability.

SUMMARY OF THE EXEMPLARY EMBODIMENTS

The foregoing and other problems are overcome, and other advantages are realized, in accordance with the exemplary embodiments of this invention.

In accordance with the exemplary embodiments of this invention there is provided a method includes provisioning a multi-mode wireless communications terminal with at least one system priority list (SPL) having information that identifies a plurality of wireless network system types and, for each identified wireless network system type, at least one wireless network of that type. The method selects from the SPL a wireless network for service selectively based on one of a manually specified priority, a priority specified automatically and a priority that is specified for use automatically only during a power-on mode of operation.

Further in accordance with the exemplary embodiments of this invention there is provided a computer program product embodied in a tangible memory readable by a data processor of a multi-mode wireless communications terminal. The program product includes program instructions the execution of which result in operations that comprise accessing at least one system priority list (SPL) that comprises information identifying a plurality of wireless network system types and, for each identified wireless network system type, at least one wireless network of that type; and selecting from the SPL a wireless network for service selectively based on one of a manually specified priority, a priority specified automatically and a priority that is specified for use automatically only during a power-on mode of operation.

Further in accordance with the exemplary embodiments of this invention there is provided a mobile station comprising at least one radio frequency transceiver, a data processor and a memory coupled to the data processor. The memory stories information that comprises an overlay function and overlay parameters for use by the data processor to perform at least system selection by invoking the overlay function. The overlay parameters comprise at least one system priority list (SPL) comprising information identifying a plurality of wireless network system types and, for each identified wireless network system type, at least one wireless network of that type. The overlay function selects from the SPL a wireless network for service selectively based on one of a manually specified priority, a priority specified automatically and a priority that is specified for use automatically only during a power-on mode of operation.

Still further in accordance with the exemplary embodiments of this invention there is provided a data structure stored in a memory accessible to a data processor of a multimode wireless communications terminal. The data structure defines a System Priority List that comprises a plurality of records each comprising a System Index, a System Type, Priority Networks specifying a class of networks that are allowed to be selected in a specific system type, and System Priority specifying whether a current system has a higher preference than a system in a next record, or whether a current system has the same preference as the system in the next record.

BRIEF DESCRIPTION OF THE DRAWINGS

In the attached Drawing Figures:

FIG. 2 shows an example of a System Priority List;

FIG. 8 depicts a logic flow diagram of improved system re-selection using the SPLs shown in FIG. 6.

DETAILED DESCRIPTION

The exemplary embodiments of this invention are related to system selection and network selection for a multimode terminal when the terminal is used in multiple radio systems such as, but not limited to, GSM/WCDMA, CDMA2000, and WLAN.

Figure 4:
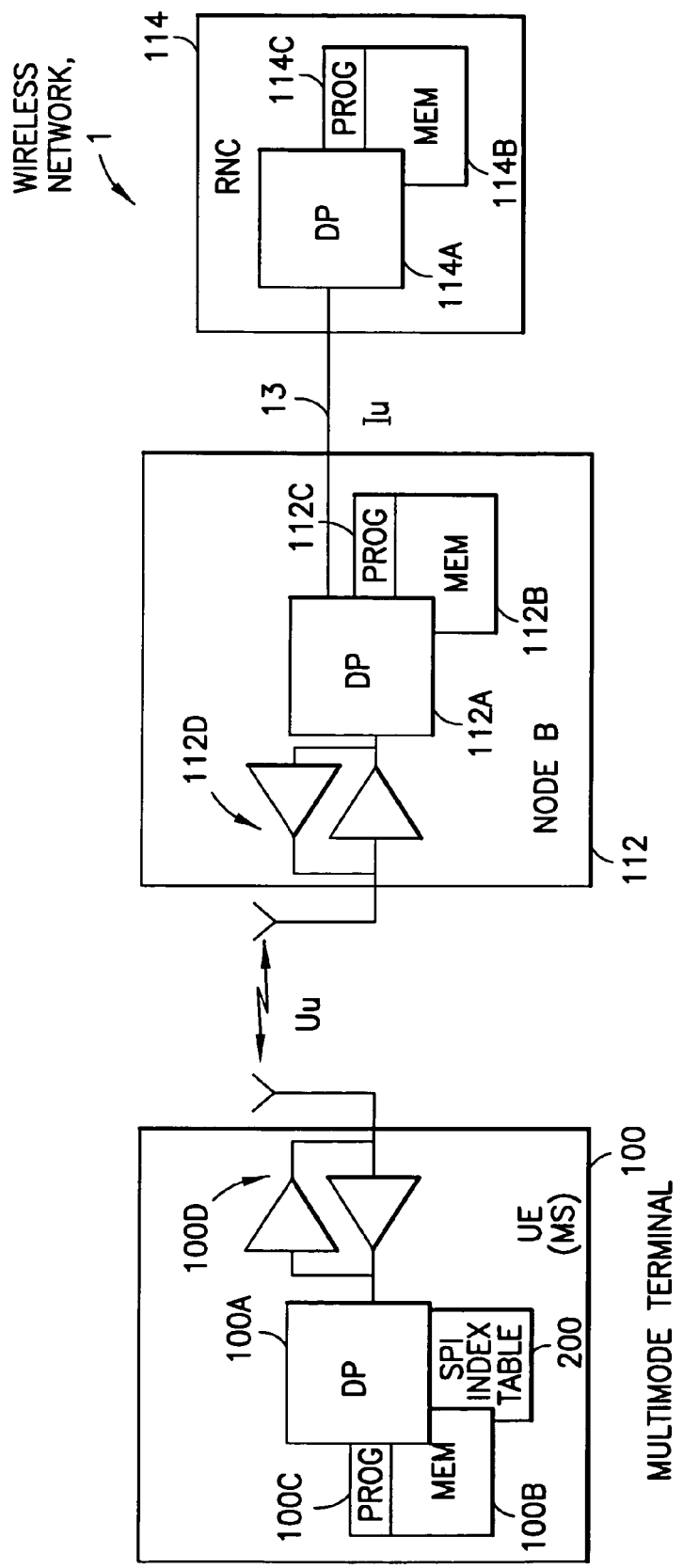
FIG. 4 is a simplified block diagram of electronic devices that are suitable for implementing the invention.

Reference is made first to FIG. 4 for illustrating a simplified block diagram of various electronic devices that are suitable for use in practicing the exemplary embodiments of this invention. In FIG. 4 a wireless network 1 includes a UE, also referred to herein interchangeably as a MT or as a MS 100, a Node B (base station) 112 and a RNC 114. The MS 100 includes a data processor (DP) 100A, a memory (MEM) 100B that stores a program (PROG) 100C, and a suitable radio frequency (RF) transceiver 100D for bidirectional wireless communications with the Node B 112, which also includes a DP 112A, a MEM 112B that stores a PROG 112C, and a suitable RF transceiver 112D. The Node B 112 is coupled via a data path 113 to at least one network element, such as the RNC 114 that also includes a DP 114A and a MEM 114B storing an associated PROG 114C. The PROGs 100C, 112C and 114C are assumed to include program instructions that, when executed by the associated DP, enable the electronic device to operate in accordance with the exemplary embodiments of this invention, as will be discussed below in greater detail.

In general, the various embodiments of the MS 100 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable at least by the DP 100A of the MS 100 and the other DPs, or by hardware, or by a combination of software and hardware.

The MEMs 100B, 112B and 114B may be of any type suitable to the local technical environment and may be implemented using any suitable data storage technology, such as semiconductor-based memory devices, magnetic memory devices and systems, optical memory devices and systems, fixed memory and removable memory. The DPs 100A, 112A and 114A may be of any type suitable to the local technical environment, and may include one or more of general purpose computers, special purpose computers, microprocessors, digital signal processors (DSPs) and processors based on a multi-core processor architecture, as non-limiting examples.

The exemplary embodiments of this invention are described in the context of an overlay framework that includes an overlay function that implements the logic of multimode system selection in cooperation with overlay parameters that are linked to the overlay function. The teachings of this invention are directed at least in part to the overlay parameters, and to how the overlay function uses a system priority configuration in the overlay parameters.

Figure 1:
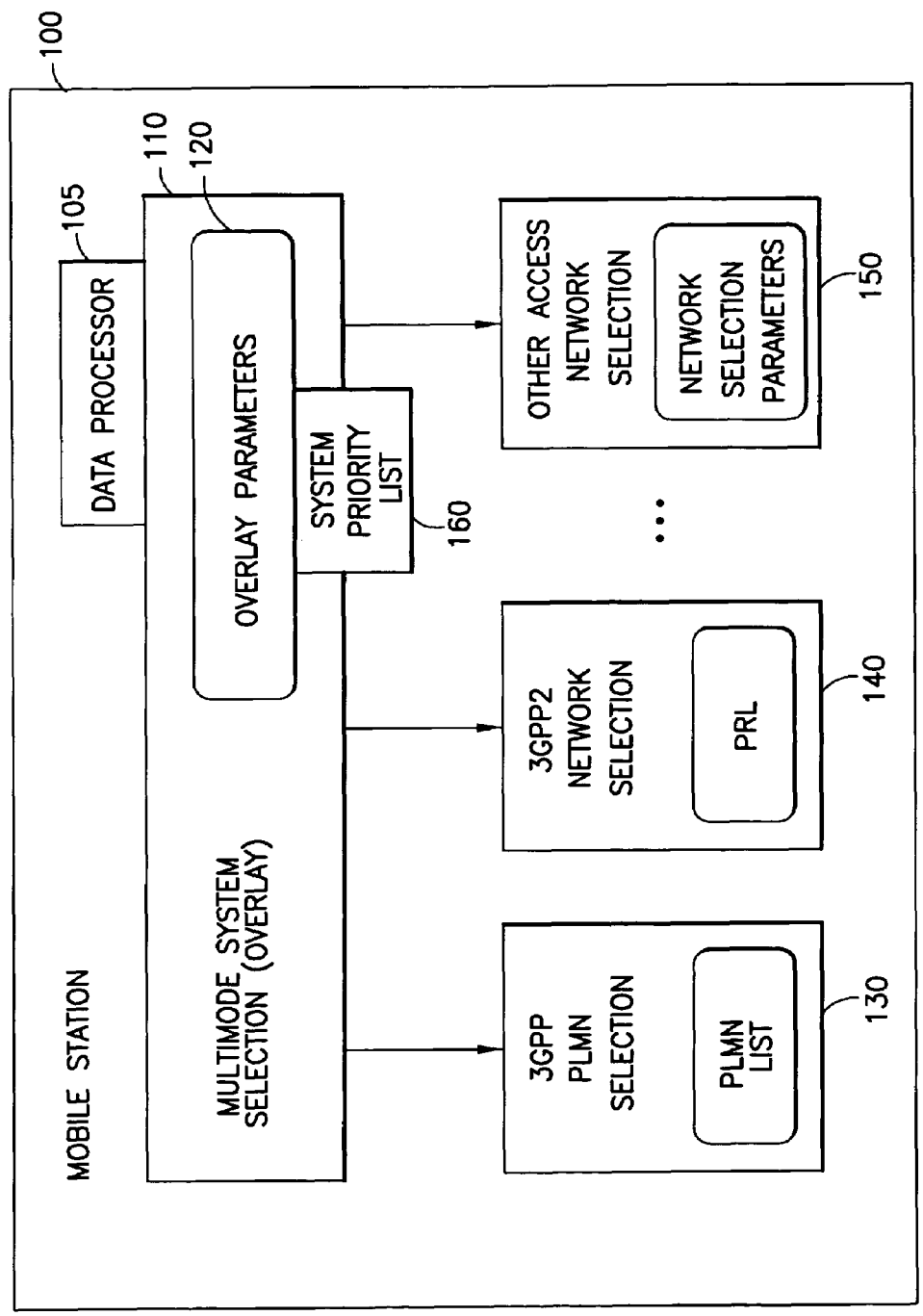
FIG. 1 depicts the concept of an Overlay function in a multimode terminal.

FIG. 1 depicts the concept of an Overlay function 110 in a multimode terminal, referred to also as the MS 100. The overlay function 110 has associated therewith the overlay parameters 120, and invokes a PLMN list 130 based process for 3GPP PLMN network selection, a PRL list 140 based process for 3 GPP2 (CDMA) network selection, and other access network selection processes using specific network selection parameters. The multimode terminal 100 is assumed to include the suitably programmed data processor 100A for executing the overlay function 110 and data storage for storing overlay parameters in accordance with the examples of this invention.

Exemplary aspects of the invention described herein include a method for the overlay function 110 to use overlay mode settings and, based on the overlay mode settings, to use a system priority list.

Exemplary aspects of the invention described herein further include a method to define a system priority list that is configurable by network operators and/or users. The multimode terminal 100 may employ the system priority list to perform system selection and network selection according to the procedures defined herein.

The aspects of this invention described herein further include a method to define preferences of system type (i.e. radio access technologies) in the system priority list. The multimode terminal 100 may use preferences to select priority systems to perform network selection.

Further exemplary aspects of the invention described herein further include a method to define priority networks (for example, a HOME network or networks) for a specific system type in the system priority list. The multimode terminal 100 may then confine network selection to priority networks only when the specific system type is selected.

Further exemplary aspects of the invention described herein further include a method that provides a means to define network selection preferences over system selection preferences without imposing new requirements to system specific radio protocol standards, e.g., in 3GPP and 3GPP2.

Still further exemplary aspects of this invention described herein include a procedure to use the system priority list to perform automatic system selection and network selection.

The system priority list and overlay mode settings may be stored in the memory 100B of the MS 100 or in other memory, such as a "smart card" embodied as a Removable User Identity Module (R-IUM) or a Subscriber Identity Module (SIM), as two non-limiting examples.

Still referring to FIG. 1 the overlay function 110 takes overlay parameters 120 as input to perform system selection. When a system is selected, the overlay function 110 invokes system-specific network selection procedures to perform network selection. A system specific network selection procedure can be a PLMN-based 3GPP network selection procedure (PLMN list 130), PRL-based 3GPP2 network selection procedure (PRL list 140), or network selection procedures for other radio access technologies, such as wireless local area network (WLAN) technologies (list 150). The overlay parameters 120 are used to define system and network preferences. They may be configurable by operators and/or users via appropriate provision mechanisms.

The overlay parameters 120 may actually be implemented as tables: e.g., a Configuration table, the System Priority (List) Table and an Overlay Performance Parameters table, as non-limiting examples.

The overlay function 110 may be considered generally a program that resides in or that is otherwise coupled to a multimode mobile station, and performs the function of network selection in the mobile station. It may be implemented as part of the radio software. The overlay function 110 may incorporate the logic of selecting a network in the most higher priority system based on a predefined set of criteria and the current configuration.

The overlay parameters 120 may be considered as a data structure for storage in the memory of the multimode MS 100 for use by the system selection overlay function 110. The data structure comprises information that may specify whether the overlay function 110, after being invoked, is to first scan for a home system or is to first scan for a non-home system, and further comprises system acquisition parameters. The information found in the overlay parameters data structure 120 may further specify whether the overlay function is to rescan for the home system in the event the non-home system is acquired, and at least one rescan-related parameter, such as a rescan interval.

In accordance with the exemplary embodiments of this invention the following data are specified to comprise at least apart of the overlay parameters 120. Reference is also made to FIG. 2 for showing an example of a system priority list SPL 160 in accordance with the exemplary embodiments of the invention.

System Priority List 160

A record of the system priority list 160 includes the following non-limiting attributes:
System Index 160A—an index of the system record in the system priority list 160, e.g. 0, 1, . . .
System Type 160B—a type of radio access technology, e.g., CDMA2000, GSM/WCDMA, WLAN, . . .
Priority Networks 160C—a class of networks that are allowed to be selected in a specific system type. If the system type 160B is a 3GPP system (e.g., a GSM/WCDMA system), the following Priority Networks are preferred for use:
HOME—home PLMNs only
PREFERRED—home PLMNs+preferred visiting PLMNs
ANY—any PLMNs
If the system type 160B is a 3GPP2 system (e.g., a CDMA2000/IS95 system), the following Priority Networks are preferred for use:
HOME—home networks only
PREFERRED—home network+preferred roaming networks
ANY—any network
System Priority 160D—defines whether a current system has a higher (more) preference than a system in the next record, or whether a current system has the same preference as the system in the next record, i.e., MORE or SAME.

The exemplary embodiments of this invention also define an Overlay Mode Setting:
Manual—overlay function 110 is disabled, i.e., user manual selection only is used.
Automatic—overlay function 110 is enabled.
Automatic Power-up Only—overlay function 110 is enabled but upon power-up only.

By provisioning the MS 100 with the non-limiting example of a data structure that represents the system priority list 160 shown in FIG. 2, the system operator expects the terminal 100:
to acquire a home network of CDMA as the first priority;
to acquire a home network of GSM/WCDMA as the second priority;
to acquire any network of WLAN as the second priority (i.e., same priority as the previous index);
to acquire a preferred network of GSM/WCDMA as the third priority; and
to acquire any network of GSM/WCDMA as the fourth priority.

Figure 3:
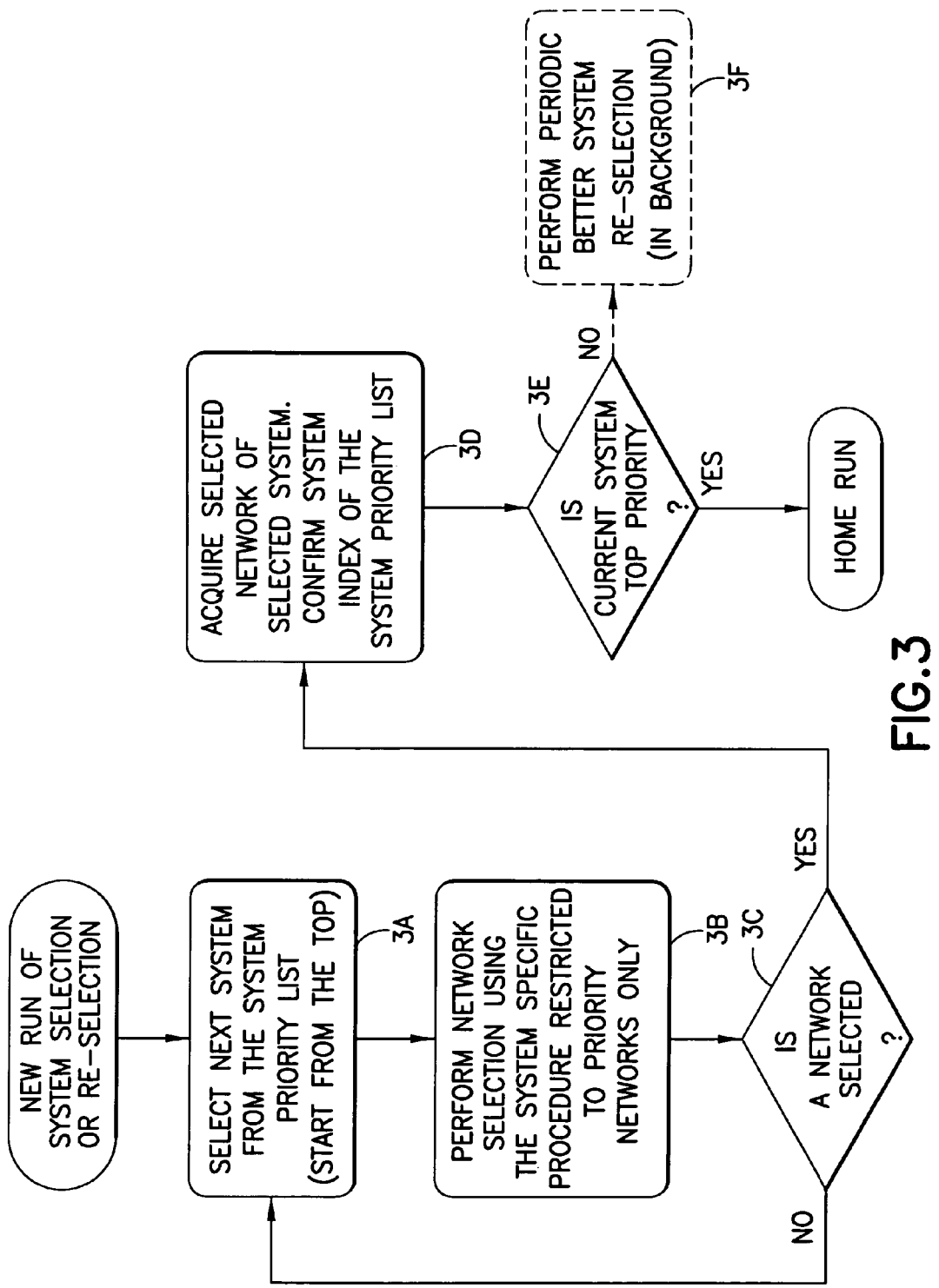
FIG. 3 illustrates an Overlay Function Flow Chart.

Further in accordance with the exemplary embodiments of this invention the following overlay function 110 procedures are specified to perform automatic multimode system selection. While described to a certain degree in the context of CDMA terminology, it should be appreciated that the ensuing description applies equally to 3GPP network selection. Reference is also made to the logic flow diagram of FIG. 3.

If the Overlay Mode Setting is set to Manual, the overlay function 110 is disabled.

If the Overlay Mode Setting is set to Automatic, the overlay function 110 is executed as follows:

A. At network selection state with appropriate causes, such as power-up and loss of coverage, the overlay function 110 selects the first or highest priority system record in the system priority list 160 (Block 3A in FIG. 3).

B. The overlay function 160 invokes a system-specific network selection procedure to search for one of the priority networks that are specified in the system record. (Block 3B in FIG. 3).

C. If a priority network is found in the selected system (Block 3C in FIG. 3), the overlay function 160 invokes a system specific network selection procedure to acquire the network. The overlay function 110 confirms and re-matches the current system index in the system priority list (Block 3D in FIG. 3). The MS 100 begins an idle mode procedure.

D. If the current system record is not the highest priority system (Block 3E in FIG. 3), the overlay function 110 performs periodic better system (i.e., with higher priority) re-selection in the background (Block 3F in FIG. 3).

E. If a priority network is not found in the selected system (Block 3C in FIG. 3), the overlay function 110 selects the next system record (next highest priority) in the system priority list 160 and repeats the illustrated process (Blocks 3A and 3B in FIG. 3).

If Overlay Mode Setting is set to Automatic Power-on Only, the overlay function 110 executes as follows:

A. At power-on, the overlay function 110 selects the first system record or the highest priority system record in the system priority list 160.
B. The overlay function 110 invokes system specified network selection procedure to search for one of priority networks that specified in the system record.
C. If a priority network is found in the selected system, the overlay function invokes system specific network selection procedure to acquire the network. The overlay function 110 confirms and re-matches the current system index in the system priority list 160. The terminal 100 begins the idle mode procedure.
D. If a priority network is not found in the selected system, the overlay function 110 selects the next system record (next highest priority) in the system priority list and repeats Step B above.

In the Automatic on power-on only mode of operation the overlay function 110 preferably performs automatic selection based on the system priority list 160 only on power-on.

The MS 100 may maintain a list in memory 100B of recently acquired networks, as well as associated system records. Recently acquired networks and system records may be used to facilitate the network and system selection process in an implementation-specific manner.

It is also within the scope of the teachings of the exemplary embodiments of this invention to provide a geographic location-based parameter in the system priority list 160 to facilitate the system selection process in a geographic location. Geographical (GEO) aspects of these teachings are described in further detail below.

In some cases it may be required or preferred that manual selection should always have precedence over automatic system selection in the multimode case.

As an overview of the foregoing description, the overlay function 110 performs multimode system selection. The overlay function 110 takes overlay parameters 120 as input. The overlay parameters 120 may be specified in 3GPP2 (for provision). The overlay function 110 may be implementation specific.

In accordance with a method, apparatus and computer program the exemplary embodiments of this invention provide a multimode terminal where the overlay parameters 120 include the System Priority List 160 that defines the system index, defines the system type of access technology, defines priority networks for a specified system type, and defines system priority among access technologies.

An overlay mode setting is provided as: Manual, where the overlay function 110 is disabled, i.e., user selection only; Automatic, where the overlay function 110 is enabled, and as Automatic Power-up Only, where the overlay function 110 is enabled only on power-up.

Priority Networks define a class of networks that are allowed to be selected in a specified system type. Priority Networks provides a means to define network selection priority over system selection priority.

Priority Networks in 3GPP systems may be:
HOME—home PLMNs only,
PREFERRED—home PLMNs+preferred visiting PLMNs, and
ANY—any PLMNs.

Priority Networks in 3GPP2 systems may be:
HOME—Home networks only,
PREFERRED—home network+preferred roaming networks, and
ANY—any network.

Priority Networks in other access technologies may be:
HOME, and
ANY.

The System Priority provides a means to define preferences of system types, i.e., radio access technologies.

System Priority may be:
MORE—the current system type is of higher priority than the next system type in the list 160, and
SAME—the current system type is of the same priority as the next system type in the list 160.

The system selection methods disclosed above meet proposed 3GPP2 multimode system selection requirements.

The system selection methods disclosed above are simple to implement, and do not require any change to existing radio access standards in 3GPP and 3GPP2.

A discussion in now made of enhancements to the foregoing exemplary embodiments in order to implement a GEO feature.

It is first noted that one system priority list, to be used universally, may not provide the necessary flexibility in certain use cases. Network operators may prefer one set of system priority when the MS 100 is roaming in one country (and/or network), and may then prefer a different set of system priority when the MS 100 is roaming in another country (and/or network).

The exemplary embodiments of this invention provide a solution to the problem presented by system priority changes while roaming where the country and/or network changes. The exemplary embodiments of this invention provide improved system and network selection performance in certain use cases.

Figure 6:
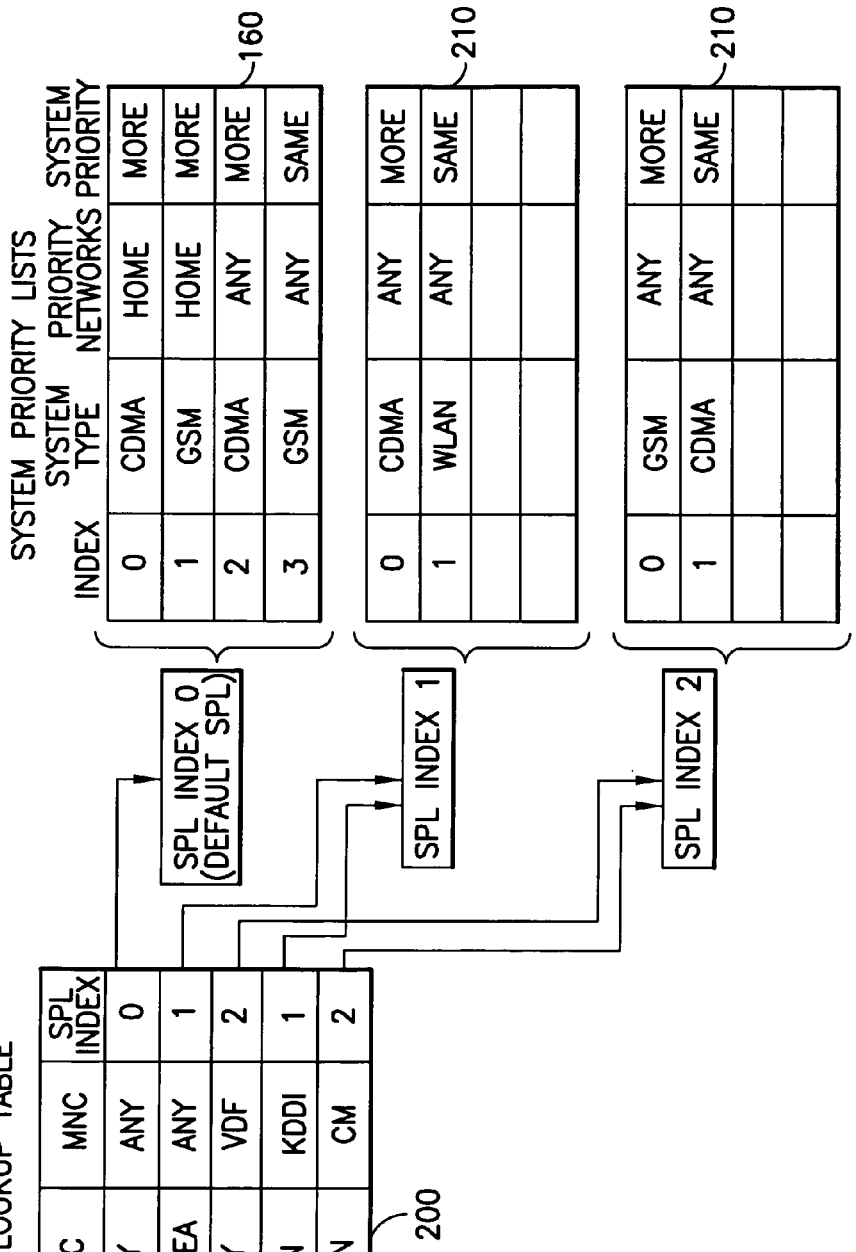
FIG. 6 shows an example of a plurality of System Priority Lists (SPLs) and associations.

The exemplary embodiments of this invention provide in one aspect thereof a method to define what may be referred to as location-associated system priority lists, also referred to as network-associated system priority lists. The MT 100 may be provisioned with none, one, or more than one location-associated system priority list, in addition to a default system priority list, such as that described above in the context of the SPL 160 shown in FIGS. 1 and 2. The multimode terminal 100 may choose to use the default system priority list 160, or a location-associated system priority list 210, as shown in FIG. 6, to perform system selection and re-selection when certain geographical location information or network information is available.

The exemplary embodiments of this invention provide in another aspect thereof a method to perform automatic system and network selection effectively using the network-associated system priority lists 210, in addition to the default system priority list 160.

The exemplary embodiments of this invention provide in a further aspect thereof a method to use a MCC and/or a MNC as geographical location information or network information in mobile/cellular networks, and/or SSID in WLAN systems to define location-associated system priority lists. If available, some other format of location/network information may be used as well. In other words, a system priority list identifier may be used to uniquely associate a system priority list with network identifier or country code.

Initially the MS 100 receives a network identity and country code (or some similar information) in an air interface message, e.g., as the MNC/MCC received in a system overhead message in CDMA. An initial scan for systems by the MS 100 can be based on a most recently acquired systems list, or on a default system priority list. The MS 100 performs re-selection by matching the network identifier or country code with the entries in a network identification/country code list (this information may be referred to as an Overlay System Group Table). The overlay function 110 (FIG. 1) then uses the system priority list associated with the matching entry for system re-selection.

Figure 5:
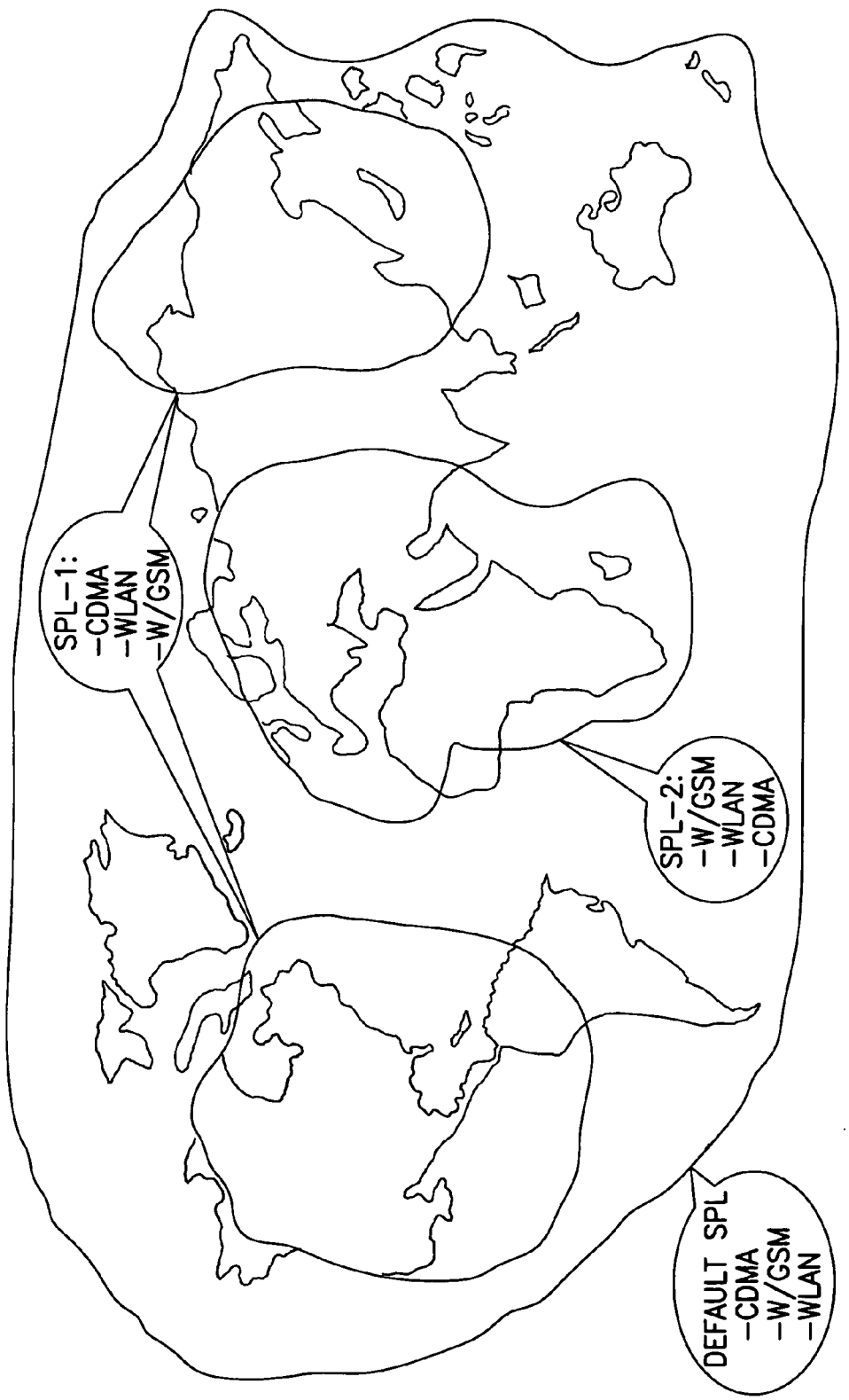
FIG. 5 illustrates the concept of Location Association over a geographical region.

As shown in the non-limiting example of FIG. 5, a default SPL (non-GEO specific) can include, in priority order, CDMA, W/GSM and WLAN systems. A first GEO-specific SPL (SPL-1), that is associated with North America, Central America and Asia, can include, in priority order, CDMA, WLAN and W/GSM systems. A second GEO-specific SPL (SPL-2), that is associated with Europe and Africa, can include, in priority order, W/GSM, WLAN and CDMA systems. If the MT 100 were located in, for example, Australia, then the default SPL is used for system selection/re-selection, while if the MT 100 were located in, for example, Turkey, then SPL-2 may be used for system selection/re-selection. More or less than the two illustrated GEO-specific SPLs (SPL-1, SPL-2) may be provisioned.

Referring now to FIG. 6, a location-associated "System Priority List" (SPL) index lookup table 200 is configured in the MT 100 (shown also in FIG. 4). The configuration mechanism may be either static or dynamic (e.g., via OTA or UIM). Based on location/network information, e.g. MCC/MNC, the location-associated "System Priority List" (SPL) index lookup table 200 is configured so that a preferred mapping from "MCC/MNC" (i.e. location/network information) to a SPL 210 can be derived when multi-mode system selection or re-selection is performed. Note that some entries in the location-associated "System Priority List" (SPL) index lookup table 200 may point to the same SPL 210, e.g., the exemplary entries for */Vodaphone and China/Mobile.

In addition, the default SPL 160 may also be configured in the MT 100.

In addition, zero, one, or more than one location-associated SPLs 210 are configured in the MT 100. The format of the location-associated SPLs 210 may be similar or identical to that of the DEFAULT SPL 160, as described above.

Figure 7:
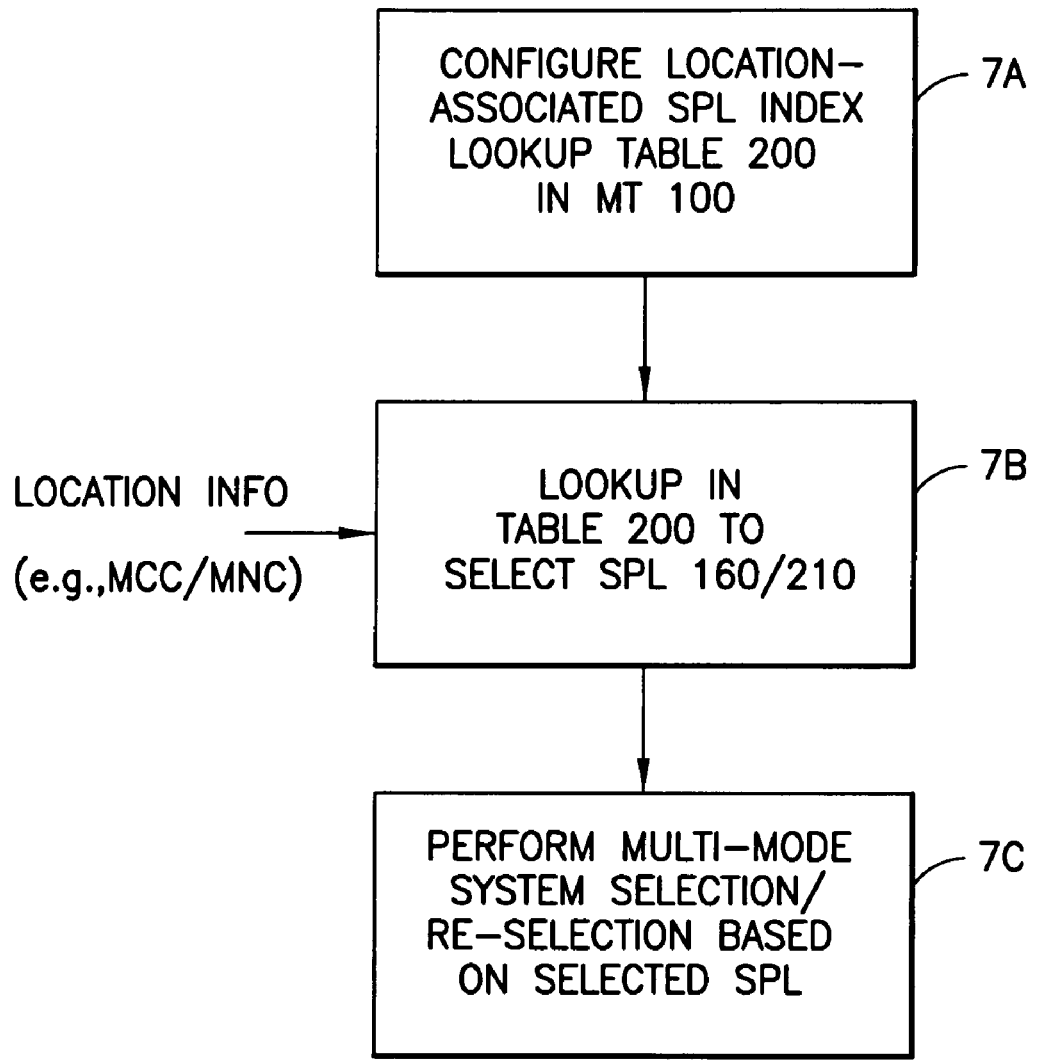
FIG. 7 is a logic flow diagram that illustrates a method in accordance with the exemplary embodiments of this invention.

Referring to FIG. 7, in accordance with exemplary methods, apparatus and computer program products the location-associated SPL index lookup table 200 is configured in the in the MT 100 (Block 7A) by any suitable mechanism, such as manually or by over-the-air programming as two non-limiting examples. At Block 7B a look-up is performed in the location-associated SPL index lookup table 200 to select a SPL 160 or 210. The key for the table lookup procedure is location information, such as location/network information, which may be MCC/MNC information or some other format of location/network information, if available. The output of the table lookup process is the SPL index which points to a SPL (either the default SPL 160 or a location-associated SPL 210). At Block 7C, and based on the selected SPL, multi-mode system (re)selection is performed according to the procedure described in detail above.

Referring to FIG. 8, an improved system selection/re-selection method acquires a network (Block 8A); selects a SPL 160/210 based on, for example, the MCC/MNC (Block 8B); performs an SPL index match on the selected SPL 160/210; if there is no higher priority system/network indicated (Block 8D), then the method ends with the selected system/network (Block 8E). However, if there is a higher priority system/network indicated in the selected SPL 160/210, then the method instead proceeds to Block 8F to continue system/network re-selection (e.g., as a background task), and if a new (higher priority) network is located (Block 8G) the method returns to Block 8B.

It should be noted that the system priority list and overlay mode settings may be programmed/managed over-the-air (OTA) using OTASP/OTAPA methods, or by IP based methods (OMA-DM/IOTA-DM), as two non-limiting examples. In general, the SPL, the location associated priority index, as well as all overlay parameters, may be derived from and/or updated using any suitable OTA technique (e.g., with regard to a CDMA system see, for example, 3GPP2 C.S0064-0, Version 1.0, Sep. 6, 2005, "IP Based Over-the-Air Device Management (IOTA-DM) for cdma2000 Systems", Release 0). During use of the OTA technique the applicable OTA data may be received through the transceiver 100D for storage in the memory 100B by the DP 100A.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   storing, at a multi-mode wireless communications terminal, at least two system priority lists, each system priority list comprising information identifying a plurality of wireless network system types and a relative priority for each of the identified wireless network system types, where the at least two system priority lists include a default, non-location specific system priority list;

obtaining location/network information comprised of at least one of network identity information and geographical location information;

selecting, based on the obtained location/network information, an associated system priority list; and selecting from the selected system priority list a wireless network for service based on a priority specified automatically or a priority that is specified for use automatically only during a power-on mode of operation, where selecting the wireless network for service comprises:

selecting one of a first or a highest priority wireless system in the selected system priority list;

invoking a system-specific network selection procedure to search for an associated priority network system;

if the associated priority network system is found in the selected wireless network, invoking a system specific network selection procedure to acquire the associated priority network system; and if the associated priority network system is not found in the selected wireless network, selecting a next highest priority wireless network system and invoking a system-specific network selection procedure to search for an associated priority network.

2. The method of claim 1, where if the currently selected wireless network system is not the highest priority wireless network system, further comprising periodically searching for a higher priority wireless network system.

3. The method of claim 1, where obtaining location/network information comprises determining information descriptive of a current location of the multi-mode wireless communications terminal.

4. The method of claim 1, where selecting the associated system priority list comprises using a system priority list index lookup table to map the obtained location/network information to the associated system priority list.

5. The method of claim 4, further comprising updating at least one of the at least two system priority lists and the system priority list index lookup table using an over-the-air technique.

6. The method of claim 1, where the obtained location/network information comprises at least one of a network identifier, a system identifier, a mobile country code and a mobile network code.

7. The method of claim 1, where the selected wireless network is used for performing one of multi-mode system selection or multi-mode system re-selection.

8. A memory readable by a data processor of a multi-mode wireless communications terminal and comprising program instructions the execution of which result in operations that comprise:

obtaining location/network information comprised of at least one of network identity information and geographical location information;

selecting, based on the obtained location/network information, an associated system priority list from at least two system priority lists, each system priority list comprising information identifying a plurality of wireless network system types and a relative priority for each of the identified wireless network system types, where the at least two system priority lists include a default, non-location specific system priority list; and selecting from the selected system priority list a wireless network for service based on a priority specified automatically or a priority that is specified for use automatically only during a power-on mode of operation, where selecting the wireless network for service comprises:

selecting one of a list or a highest priority wireless network system in the selected system priority list;

invoking a system-specified network selection procedure to search for an associated priority network system;

if the associated priority network is found in the selected wireless network, invoking a system specific network selection procedure to acquire the associated priority network system; and if the associated priority network system is not found in the selected wireless network, selecting a next highest priority wireless network system and invoking a system-specific network selection procedure to search for an associated priority network.

9. The memory of claim 8, where if the currently selected wireless network system is not the highest priority wireless network system, further comprising an operation of periodically searching for a higher priority wireless network system.

10. The memory of claim 8, where obtaining location/network information comprises determining information descriptive of a current location of the multi-mode wireless communications terminal.

11. The memory of claim 8, where selecting the associated system priority list comprises using a system priority list index lookup table to map the obtained location/network information to the associated system priority list.

12. The memory of claim 11, further comprising an operation of updating at least one of the at least two system priority lists and the system priority list index lookup table using an over-the-air technique.

13. The memory of claim 8, where the obtained location/network information comprises at least one of a network identifier, a system identifier, a mobile country code and a mobile network code.

14. The memory of claim 8, where the selected wireless network is used for performing one of multi-mode system selection or multi-mode system re-selection.

15. A mobile station comprising at least one radio frequency transceiver, a data processor and a memory coupled to the data processor, the memory storing information comprising an overlay function, at least two system priority lists and overlay parameters for use by the data processor to perform at least system selection by invoking the overlay function, each system priority list comprising information identifying a plurality of wireless network system types and a relative priority for each of the identified wireless network system, where the at least two system priority lists include a default, non-location specific system priority list, where the mobile station obtains location/network information comprised of at least one of network identity information and geographical location information, where said overlay function selects, based on the obtained location/network information, an associated system priority list and selects from the selected system priority list a wireless network for service, where the overlay function when selecting the wireless network for service based on a priority specified automatically or automatically only during a power-on mode of operation operates to select one of a first or a highest priority wireless network system in the system priority list, invoke a system-specific network selection procedure to search for an associated priority network and, if a priority wireless network is found in the selected wireless network system, invoke a system specific network selection procedure to acquire the network and, if a priority network is not found in the selected wireless network system, select a next highest priority wireless network system and invoke a system-specific network selection procedure to search for an associated priority network.

16. The mobile station as in claim 15, where invoking the overlay function occurs in response to the mobile station roaming.

17. The mobile station as in claim 15, where the overlay parameters comprise home system and network identification information.

18. The mobile station as in claim 15, where the overlay function when performing system acquisition uses a Preferred Roaming List stored in the memory, a Public Land Mobile Network list stored in the memory or wireless local area network access information stored in the memory.

19. The mobile station of claim 15, where the overlay function is operable to confine wireless network selection to priority wireless networks when the corresponding wireless network system type is selected.

20. The mobile station of claim 15, where if the currently selected wireless network system is not the highest priority wireless network system, the overlay function periodically searches for a higher priority wireless network system.

21. The mobile station of claim 15, where the data processor determines information descriptive of a current location of the multi-mode wireless communications terminal.

22. The mobile station of claim 15, where the overlay function selecting the associated system priority list comprises using a system priority list index lookup table to map the obtained location/network information to the associated system priority list.

23. The mobile station of claim 22, where the mobile station updates at least one of the at least two system priority lists and the system priority list index lookup table using an over-the-air technique.

24. The mobile station of claim 15, where the obtained location/network information comprises at least one of a network identifier, a system identifier, a mobile country code and a mobile network code.

25. The mobile station of claim 15, where the selected wireless network is used by the mobile station for performing one of multi-mode system selection or multi-mode system re-selection.

26. A memory storing a data structure accessible to a data processor of a multi-mode wireless communications terminal, the data structure defining a system priority list index lookup table, the system priority list index lookup table comprising a plurality of records, each record comprising location/network information and an identifier of an associated system priority list, where the system priority list index lookup table comprises a default record for a default, non-location specific system priority list, where the location/network information is comprised of at least one of network identity information and geographical location information, where the data structure enables the multi-mode wireless communications terminal to use location/network information with the system priority list index lookup table in order to obtain an associated system priority list identifier for the location/network information, where the multi-mode wireless communications terminal is operable to use the system priority list index lookup table by;

obtaining location/network information comprised of at least one of network identity information and geographical location information;

selecting, based on the obtained location/network information, an associated system priority list from the system priority list index lookup table; and selecting from the selected system priority list a wireless network for service based on a priority specified automatically or a priority that is specified for use automatically only during a power-on mode of operation, where the multi-mode wireless communications terminal selecting the wireless network for service comprises:

selecting one of a first or a higher priority wireless network system in the selected system priority list;

invoking a system-specific network selection procedure to search for an associated priority network system;

if the associated priority network is found in the selected wireless network, invoking a system specific network selection procedure to acquire the associated priority network system; and if the associated priority network system is not found in the selected wireless network, selecting a next highest priority wireless network system and invoking a system-specific network selection procedure to search for an associated priority network.

27. The memory of claim 26, where the location/network information comprises at least one of a network identifier, a system identifier, a mobile country code and a mobile network code.

* * * * *

UNITED STATES PATENT AND TRADEMARK OFFICE
CERTIFICATE OF CORRECTION

PATENT NO. : 7,689,218 B2
APPLICATION NO. : 11/403443
DATED : March 30, 2010
INVENTOR(S) : Jiang et al.

It is certified that error appears in the above-identified patent and that said Letters Patent is hereby corrected as shown below:

Claim 15, col. 12, line 48 insert --types-- in between system and where.

Signed and Sealed this

Eighteenth Day of May, 2010

David J. Kappos
*Director of the United States Patent and Trademark Office*